United States Patent
Band et al.

(10) Patent No.: US 8,453,198 B2
(45) Date of Patent: May 28, 2013

(54) POLICY BASED, DELEGATED LIMITED NETWORK ACCESS MANAGEMENT

(75) Inventors: Iver E. Band, Portland, OR (US); William G. Howe, Lawrenceville, NJ (US); Prasad V. Rao, Edison, NJ (US); Peter An-Ping Huang, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1453 days.

(21) Appl. No.: 11/965,262

(22) Filed: Dec. 27, 2007

(65) Prior Publication Data
US 2009/0172789 A1 Jul. 2, 2009

(51) Int. Cl.
*H04L 29/06* (2006.01)

(52) U.S. Cl.
USPC .............................................. 726/1; 713/223

(58) Field of Classification Search
USPC .... 726/1, 2, 4–6, 12, 17, 18, 27–30; 713/154, 713/159, 164, 166, 185; 711/100, 163; 705/53, 705/56; 707/609, 672, 673, 705, 741, 758, 707/783–785, 830; 709/202, 223, 225, 229
See application file for complete search history.

(56) References Cited

U.S. PATENT DOCUMENTS

| | | | |
|---|---|---|---|
| 6,961,809 B2 * | 11/2005 | Krishnan et al. | 711/108 |
| 7,380,025 B1 * | 5/2008 | Riggins et al. | 710/8 |
| 7,874,008 B2 * | 1/2011 | Chang et al. | 726/27 |
| 8,065,712 B1 * | 11/2011 | Cheng et al. | 726/1 |
| 2003/0061463 A1 * | 3/2003 | Tibbetts | 712/1 |
| 2005/0138419 A1 * | 6/2005 | Gupta et al. | 713/201 |
| 2009/0320088 A1 * | 12/2009 | Gill et al. | 726/1 |

* cited by examiner

*Primary Examiner* — Kambiz Zand
*Assistant Examiner* — Leynna Truvan

(57) ABSTRACT

Policy-based, delegated limited network access management places day-to-day control of network access in the hands of authorized users, referred to as resource access administrators, selected for their business knowledge and ability to respond quickly to business events. Resource access administrators have the ability to respond, in the form of access decisions proposed by individuals with knowledge or, or responsibility for business processes and business partner relationships and shaped and pre-approved by network security specialists, referred to as network access administrators. This approach, therefore, reduces the cost, complexity, and delay (latency) associated with managing external network access without compromising network security.

14 Claims, 7 Drawing Sheets

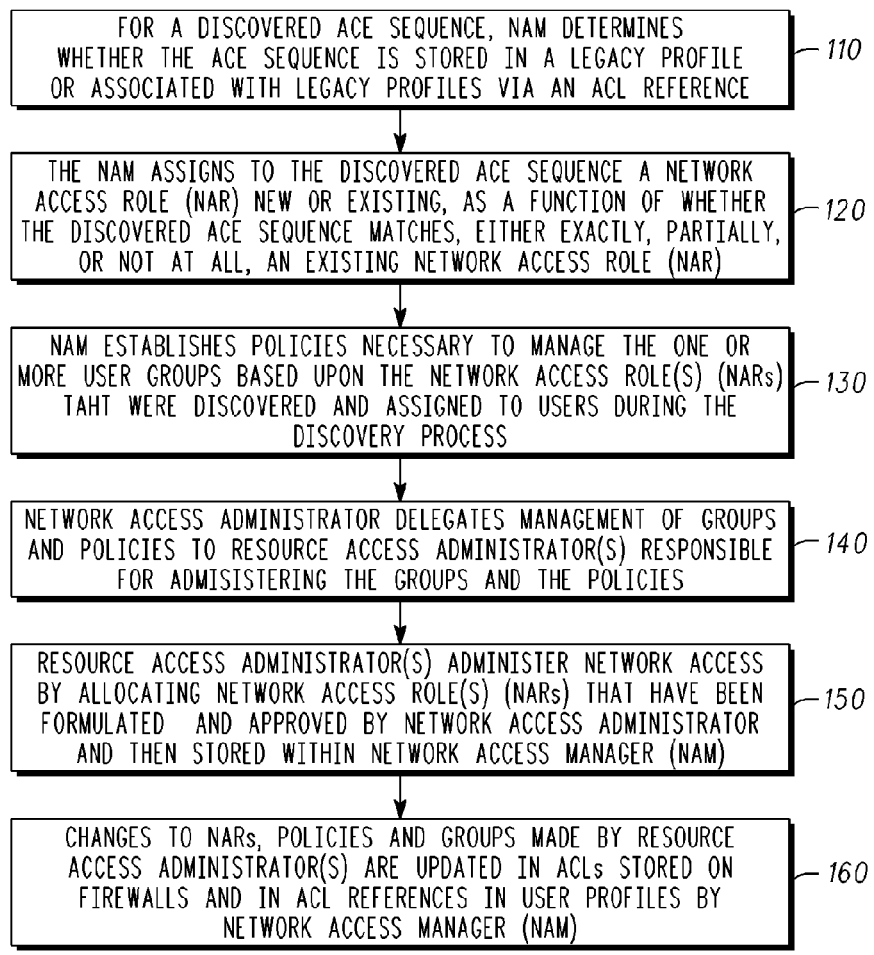
Fig. 1    100
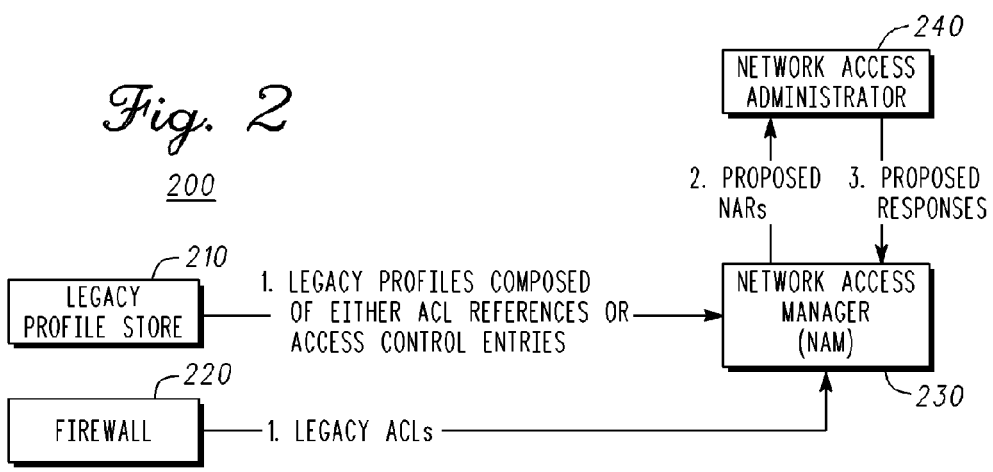
Fig. 2    200

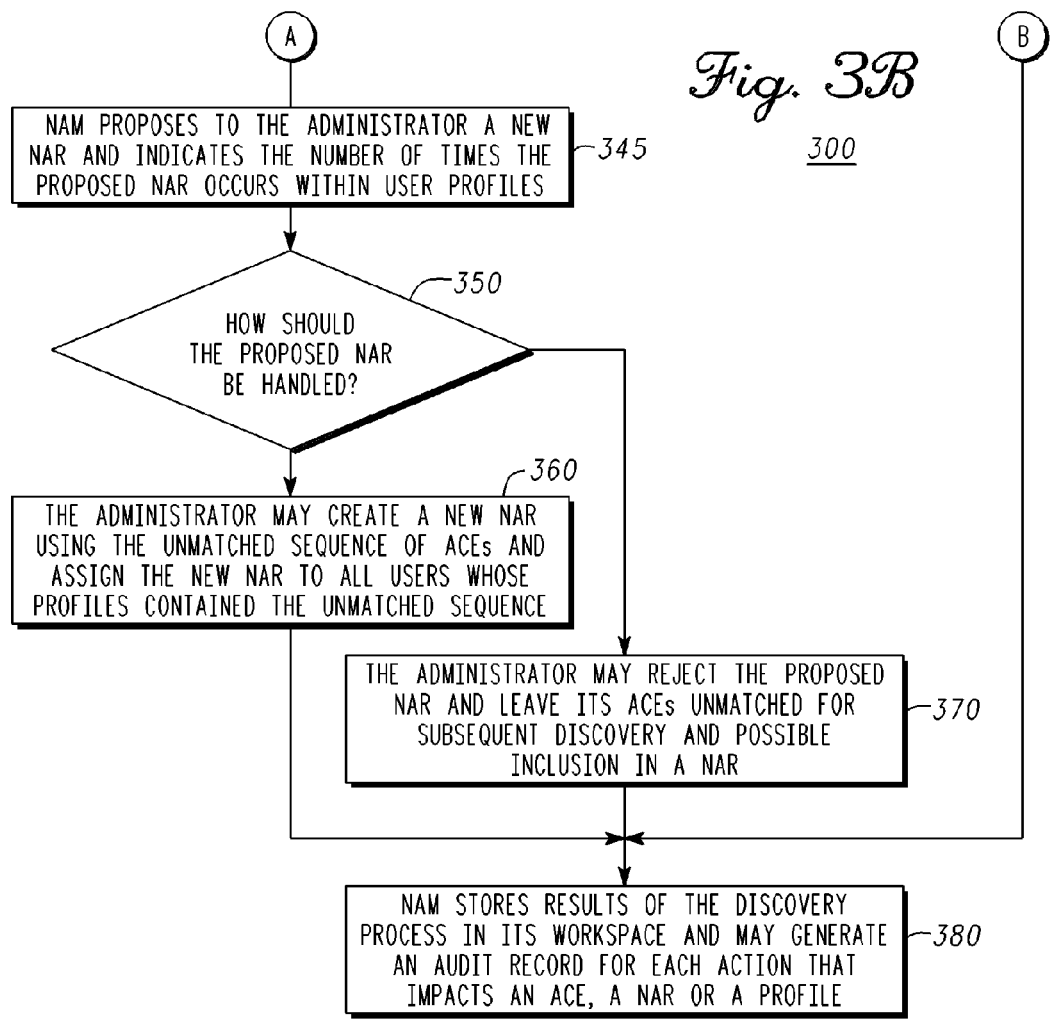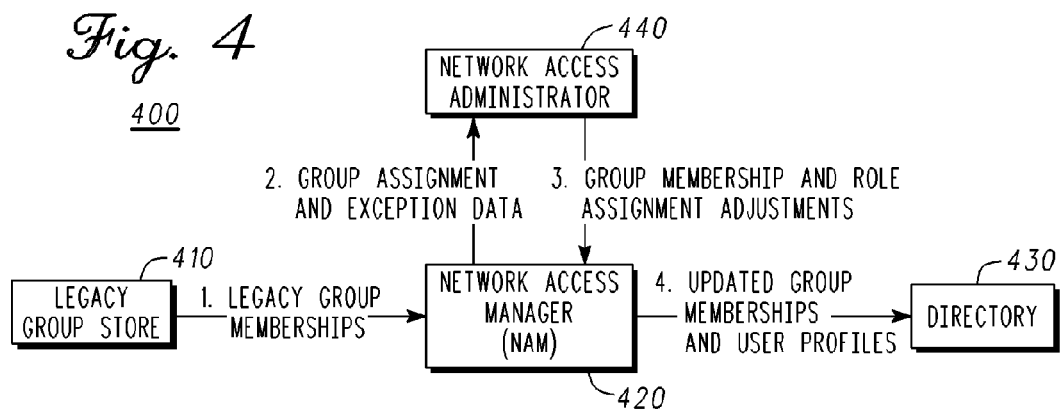

800

POLICY BASED, DELEGATED LIMITED NETWORK ACCESS MANAGEMENT

COPYRIGHT NOTICE

A portion of the disclosure of this patent document may contain material that is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

As today's enterprises increasingly rely on external service providers, suppliers and collaborators, they must provide external access to their internal networks. In order to protect the enterprise, however, the access provided must be limited to the resources needed for each working relationship.

External individuals requiring limited network access to enterprise networks typically authenticate to a firewall, which grants access based on an Access Control List (ACL) associated with their individual user profile. Today, network security personnel usually manage each external access ACL directly. Each external access ACL is researched anew, and stored as a unit without explicitly reused components. The technical nature of ACLs restricts access management to a central group of network security specialists whose time must be carefully rationed and scheduled. Up until now, limited network access management has required the participation of a group of such network security specialists each time a set of access privileges are created or modified.

It can be seen that this approach is time-consuming and inefficient, since it requires such specialized human resources that are often expensive to hire and in short supply. This often creates a bottleneck that delays the establishment and maintenance of secure external connections and creates a significant challenge that is exacerbated by global business trends. As demand for external connectivity increases due to global trade, collaboration, and outsourcing, IT staffing levels are often reduced due to increasingly demanding industry benchmarks and competitive cost reduction pressures. Under these circumstances, it is also difficult to audit ACLs, since they cannot be easily decomposed into well-understood, standard components. Further, network security specialists typically do not have direct knowledge of the business processes and relationships for which network access must be supplied, and therefore lack the context necessary to adjust ACLs in response to business events.

BRIEF DESCRIPTION OF THE DRAWINGS

The features of the invention believed to be novel are set forth with particularity in the appended claims. The invention itself, however, both as to organization and method of operation, together with objects and advantages thereof, may be best understood by reference to the following detailed description of the invention, which describes certain exemplary embodiments of the invention, taken in conjunction with the accompanying drawings in which:

FIG. 1 is a flowchart illustrating an overview of policy-based, delegated limited network access management in accordance with certain embodiments.

FIG. 2 is a functional block diagram of the discovery process, in accordance with certain embodiments.

FIGS. 3A and 3B illustrate a flowchart of the discovery process, in accordance with certain embodiments.

FIG. 4 is a functional block diagram of the policy establishment process, in accordance with certain embodiments.

Figure 3A:
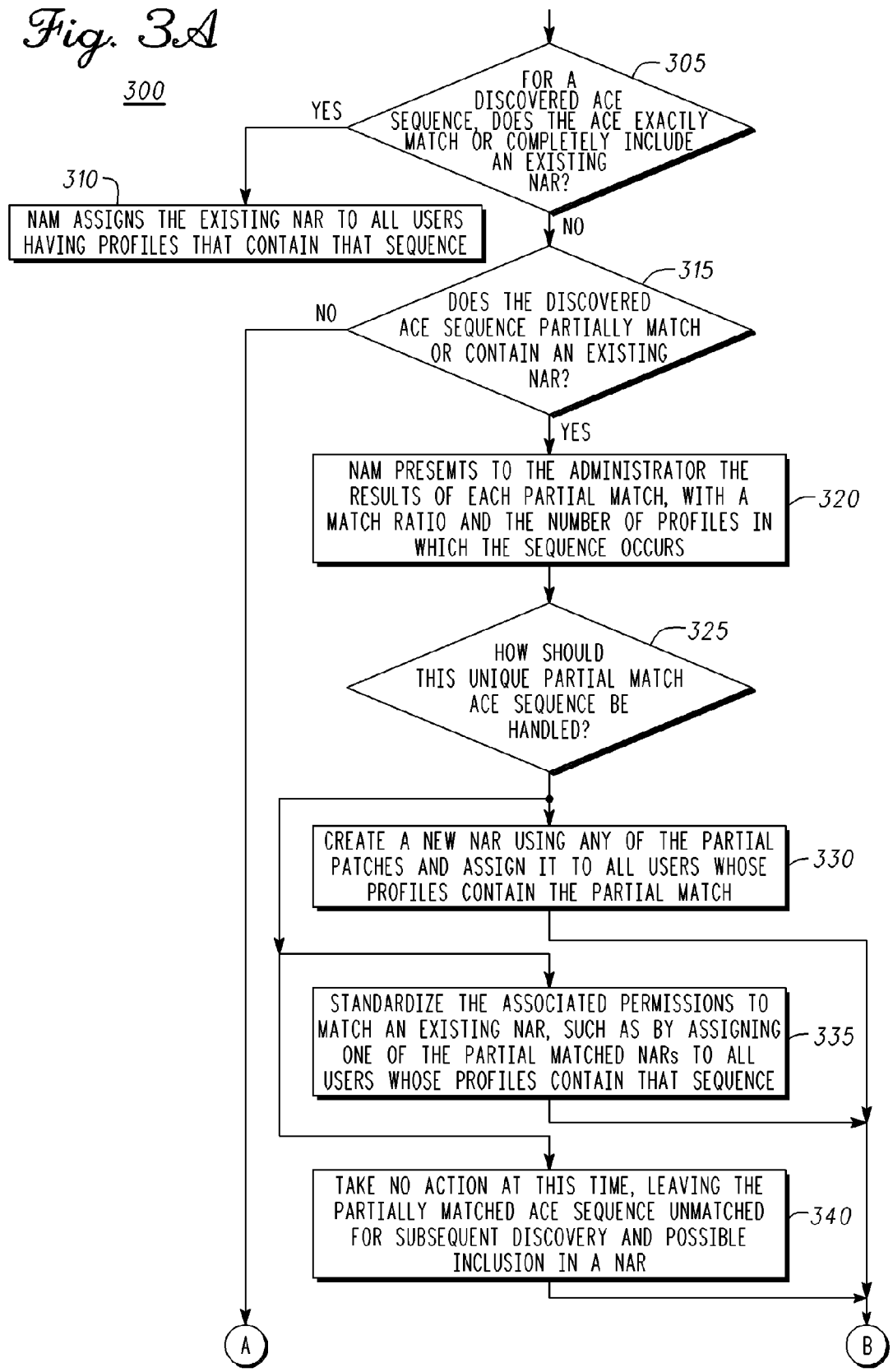

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Policy-based, delegated limited network access management places day-to-day control of network access in the hands of authorized users, herein referred to as resource access administrators, who may be selected on the basis of their business knowledge and ability to respond quickly to business events. Their ability to respond, in the form of access decisions they make are pre-approved by network security specialists, also referred to as network access administrators. This approach, therefore, reduces the cost, complexity, and delay (latency) associated with managing external network access without compromising network security; it also makes the entire process easier to audit. The embodiments described herein provide a cross-platform solution for network access management that enables authorized users, rather than network security specialists, to understand, manage, and audit network access.

It can be seen that this approach reduces the costs, delays and errors associated with managing limited network access in at least the following ways. First, the use of centralized teams of network security specialists, i.e. network access administrators, is limited to the initial design and approval of reusable sets of network privileges, known herein as network access roles (NARs). Second, NARs are managed in a central repository, thereby greatly reducing the work required to research the network access needed for each new or changed access situation. Third, by enabling the direct management of limited network access by individuals or entities (herein resource access administrators) that are knowledgeable about the business processes and relationships that must be enabled, costly, error-prone and time-consuming documentation, communication and verification processes are greatly reduced and hopefully even eliminated. Moreover, the embodiments described herein make it easier to audit limited network access; NARs express access information at a higher level than with conventional Access Control Lists (ACLs), which simply specify and control individual streams of network traffic. In accordance with various embodiments described herein, conversely, each NAR is associated with a business application or group of applications, thereby allowing an audit trail to be created for all events in the NAR lifecycle, including the use of NARs to generate ACLs for deployment on network devices, for instance.

Described herein in connection with various embodiments is the functionality and architecture of the Network Access Manager (NAM) prototype, which demonstrates a new approach for the provisioning of limited external network access connections. NAM translates low-level access configurations into higher level network access roles (NARs), and allows knowledgeable users, rather than technical specialists, to manage external access. Described herein is an example use case involving a set of external users requiring limited network access to an enterprise network. It is understood that NARs may also be considered access roles, since they may aggregate individual privileges, i.e. network access control entities. Please note that while certain embodiment(s) that perform virtual private network (VPN) access management are described, the invention is applicable to all forms of limited network access in which different user individuals or groups, applications, servers, or even other networks, have varying network access privileges.

There are a variety of terms used herein, which, for purposes of illustration and not limitation, may be considered as follows:

User—an individual.

Group—a defined subset of users, such as members of a legacy group

Directory—a data store for managing users and groups that is optimized for frequent reads and infrequent writes.

Resource—a set of software components, tools or applications commonly used together.

Profile—a set of attributes defining a user's identity and rights to access protected resources.

Legacy Profile—a profile that has not been created or validated by NAM.

Access Control Entry (ACE)—a network access rule. An example is Cisco's Internetworking Operating System (IOS) format[1] or other format supported by vendors of networking equipment.

Access Control List (ACL)—an ordered and named set of ACEs format used to control network access to resources for an authenticated user. Typical firewalls can only load one ACL per authenticated user session.

Network Access Role (NAR)—a unique named sequence of ACEs defining network access to a set of resources. Each NAR is carefully designed and reviewed by networking, security, or application specialists to ensure protection of enterprise resources and compliance with enterprise security policy. NAM uses NARs to build ACLs. A NAR can be re-used and NARs may be organized into hierarchies. An ACL may implement multiple NARs either directly or through parent NARs, and each NAR may be implemented by multiple ACLs.

Service—a type of connection employed by users to access resources that are protected by a firewall.

Policy—an association between a group, a service, and a NAR.

Policy Set—the set of policies generated and maintained by IT staff using NAM.

Discovery—the process by which NAM identifies NARs and associates NARs with users.

Policy Establishment—the process by which NAM takes the output of the discovery process and builds the groups and policies necessary for policy-based access management.

Policy-Based Access Management—the process by which NAM generates and deploys ACLs and profiles based on policies and group memberships.

Delegated Provisioning—A form of policy-based access management in which IT or business management assigns access control responsibilities to individuals based on their responsibility for business processes and partner relationships.

Network Access Administrator—A specialist in network security that uses NAM to implement and maintain policy-based access management in consultation with individuals knowledgeable about or responsible for, business processes and relationships that are dependent upon network access.

Resource Access Administrator—A Group Administrator or a Policy Administrator, i.e. and individual that controls access by individuals or groups to resources such as business applications. In order to implement delegated provisioning, these administrators must be carefully trained in policy and user group development and maintenance.

Group Administrator—A type of resource access administrator. An individual, not necessarily an IT professional, assigned by the network access administrator to administer one or more groups.

Policy Administrator—A type of resource access administrator. An individual, not necessarily an IT professional, assigned by the network access administrator to maintain one or more policies, or to create new policies for specific NARs and groups.

As previously mentioned, NAM enables network access administrators to create, annotate, maintain, and query ACEs, NARs and NAR hierarchies; this interaction between network access administrators and ACEs, NARs and NAR hierarchies may occur a variety of ways, including through a graphical user interface (GUI) or through a set of tools using XML, simple text files, or a set of validation and implementation scripts. NAM also enables the administrator to drill down into NAR hierarchies to view and edit all NAR components. Once the network access administrator changes or deletes an individual ACE, this change is reflected in all NARs that contain that ACE.

Figure 10:
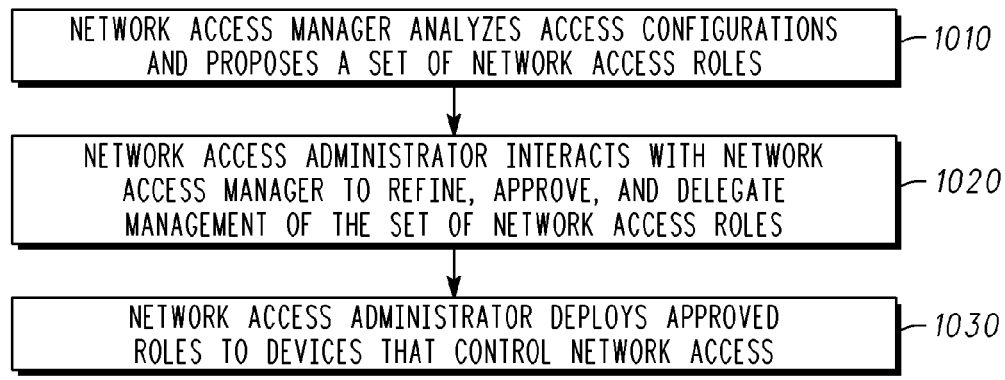
FIG. 10 is a flowchart illustrating an overview flow of network access management in accordance with certain embodiments.

Referring first to FIG. 10, flow 1000 illustrates this overview flow of network access management in accordance with certain embodiments. This flow of policy-based, delegated network access management will be further described in exemplary form in connection with the other figures to follow. At Block 1010, the network access manager analyzes access configurations of one or more user groups and proposes a set of network access roles of the one or more user groups, in accordance with the access configuration analysis. At Block 1020, a network access administrator interacts with the network access manager (NAM) to manage the set of network access roles; managing the set of network access roles include the network access administrator working with the NAM to refine, approve, and delegate management of the set of network access roles for the particular needs and environment of interest. Then, at Block 1030, the network access administrator deploys approved roles, i.e. the set of approved network access roles, to devices that control network access, as will be described.

The following sections describe three ACE and NAR management processes: *Discovery, Policy Establishment*, and *Policy-Based Access Management and Delegated Provisioning*. Referring to FIG. 1, flow 100 illustrates an overview of the discovering, policy establishment and delegated provisioning flow in accordance with certain embodiments of the present invention.

At Block 110, during the discovery phase of the process, the NAM determines, for a discovered ACE sequence, whether the ACE sequence is stored in a legacy profile or associated with legacy profiles via an ACL reference. Next during the policy establishment phase of the process, at Block 120 the NAM assigns to the discovered ACE sequence a NAR, either new or existing; the type of NAR assigned depends upon whether the discovered ACE sequence matches, partially matches, or does not match, an existing NAR. At Block 130 the NAM establishes policies necessary to manage the one or more user groups based upon the NARs that were discovered and assigned to users during the discovery process. The policy-based access management and delegated provisioning portions of the process start at Block 140, in which the network access administrator delegates management of groups and policies to Resource Access Administrators responsible for administering the groups (i.e. a Group Administrator) and the policies (i.e. a Policy Administrator). At Block 150, the Resource Access Administrator(s) administer network access by allocating NARs that have been formulated and approved by specialists and then stored within NAM. Changes to NARs, policies and groups made by Resource Access Administrator(s) are updated in ACLs stored on firewalls and in ACL references in user profiles by the NAM at Block 160.

To assist in the discussion of the various components of this overall flow, an exemplary NAM scenario is employed, having the following elements:

External Users—Six users, named Alice, Betty, Charles, David, Edward, and Frank require access to particular enterprise applications in order to perform certain services that their employers have agreed to provide to the enterprise.

External User Profiles—At the beginning of this scenario, each of the external users has a profile consisting of either a list of ACEs that give them the access they need to perform services for the enterprise, or a named ACL stored on a firewall containing such an ACE list.

External User Groups—There are two external user groups, each named after an external organization that is providing services to the enterprise:

ServiceCo—Alice, Betty, and Charles belong to this group, which is named after their employer. The access method for each of these users is via client VPN, and their access privileges are defined with a profile entry (Appendix A).

PtnrCO—David, Edward, and Frank belong to this group, which is similarly named after their employer. The access method for each of these users is via a leased line, and their access privileges are defined using a reference to a named ACL (Appendix A).

Enterprise applications and infrastructure services requiring external access include:

WFM—A complex enterprise application

WFM-PtnrCO—Additional features of WFM specifically for the use of PtnrCO in providing services to the enterprise.

Messaging—A set of email servers

DNS—the Domain Name Service, used for translating the enterprise's domain names, e.g. wfm.enterprise.com, into network addresses.

Assorted web servers using the HTTP and HTTPS protocols. Those using HTTPS are considered "secure" since their session traffic is encrypted.

Discovery

Referring now to FIG. 2, functional block diagram 200 illustrates the NAM discovery process in accordance with certain embodiments. The discovery process identifies NARs from the ACEs either stored in legacy profiles or associated with legacy profiles via an ACL reference; for instance, both named and numbered Cisco IOS ACLs are supported, and the NAM parsing engine can be extended to process other ACL formats, including those from other firewall manufacturers such as Checkpoint. These discovered NARs either match pre-defined NARs or are sequences of ACEs that occur in profiles. Accordingly, it can be seen that legacy profile store 210 provides to NAM 230 legacy profiles composed of either ACL references or access control entities (ACEs). Concurrently, firewall 220 may provide legacy ACLs to the NAM as shown. NAM 230 generates proposed NARs based upon the legacy profiles and legacy ACLs received and provides these proposed NARs to the network access administrator 240, which in turn provides responses to NAM. It can be seen that actions (1) may occur once per network environment, while actions (2) and (3) can be iterative at the administrator's discretion.

Referring to FIGS. 3A and 3B, flow 300 illustrates details of this discovery process. AT Decision Block 305, the inquiry is whether, for a discovered ACE sequence, it exactly matches or completely includes an existing NAR. If yes, then the flow goes to Block 310 where the NAM automatically assigns that existing NAR to all users whose profiles contain that sequence. If multiple NARs in an NAR hierarchy match a discovered ACE sequence, NAM assigns the most general NAR that matches the ACEs in the user profile. If no, however, then the flow continues to Decision Block 315 where the inquiry is whether the discovered ACE sequence partially matches or contains an existing NAR.

For any discovered ACE sequence that partially matches an existing NAR, NAM presents to the network access administrator the results of each partial match, with a match ratio and the number of profiles in which the sequence occurs, at Block 320. A discovered sequence may partially match multiple existing NARs. NAM presents each partial match for a given ACE sequence simultaneously. As regards the match ratio, consider the following: If D is the set of ACEs occurring in the discovered sequence, and P is the set of ACEs occurring in the pre-defined NAR, then the match ratio equals |D ∩ P|/|P|, or the number of ACEs occurring in both the discovered sequence and the pre-defined NAR divided by number of ACEs in the pre-defined NAR. Alternatively the ratio may be included as |D ∩ P|/|D ∪ P|, where the denominator represents the number of distinct ACEs in both NARs. Other examples of match ratios may be equally applicable.

The decision, at Block 325, is how this unique partial match ACE sequence should be handled in a partial match action. Partial match actions available to the network access administrator include:
  i. Create a new NAR using any one of the partial matches, and assign it to all users whose profiles contain the partial match, as at Block 330, or
  ii. Standardize the matched ACE sequence by assigning one of the partially matched NARs to all users whose profiles contain that sequence, at Block 3335, or
  iii. Leave the partially matched ACE sequence unmatched for subsequent discovery and possible inclusion in an NAR, at Block 340. It is noted that is an ACE is not included in a NAR by the end of the discovery process, it is effectively deleted from all profiles in which it occurs, since the policy-based access management process generates all ACLs only from NARs.

It is noted that assigning to the discovered ACE sequence a network access role (NAR) is determined not only by whether the discovered ACE sequence matches, either exactly, partially, or not at all, an existing NAR, but also whether the sequence is in fact a valid expression of the intent of the organization that owns or controls the network. It could be that the sequence is an erroneous (either fully or partially), sloppy or incomplete expression; consultation with experts and/or other resources, such as databases, and other entities on the network may be need to determine the bona fides of a discovered sequence.

Returning again to Decision Block 315, for any discovered ACE sequence that does not exactly match, partially match, or completely include any existing NAR, NAM proposes to the network access administrator a new NAR and indicates the number of times the proposed NAR occurs within user profiles, at Block 345. At Block 350, a decision must be taken about how this proposed NAR should be handled the administrator may take a no match action, such as:
  i. Create a new NAR using the unmatched sequence of ACEs and assign it to all users whose profiles contain the unmatched sequence, at Block 360.
  ii. Reject the proposed NAR, and leave its ACEs unmatched for subsequent discovery and possible inclusion in an NAR, at Block 370.

Figure 9:
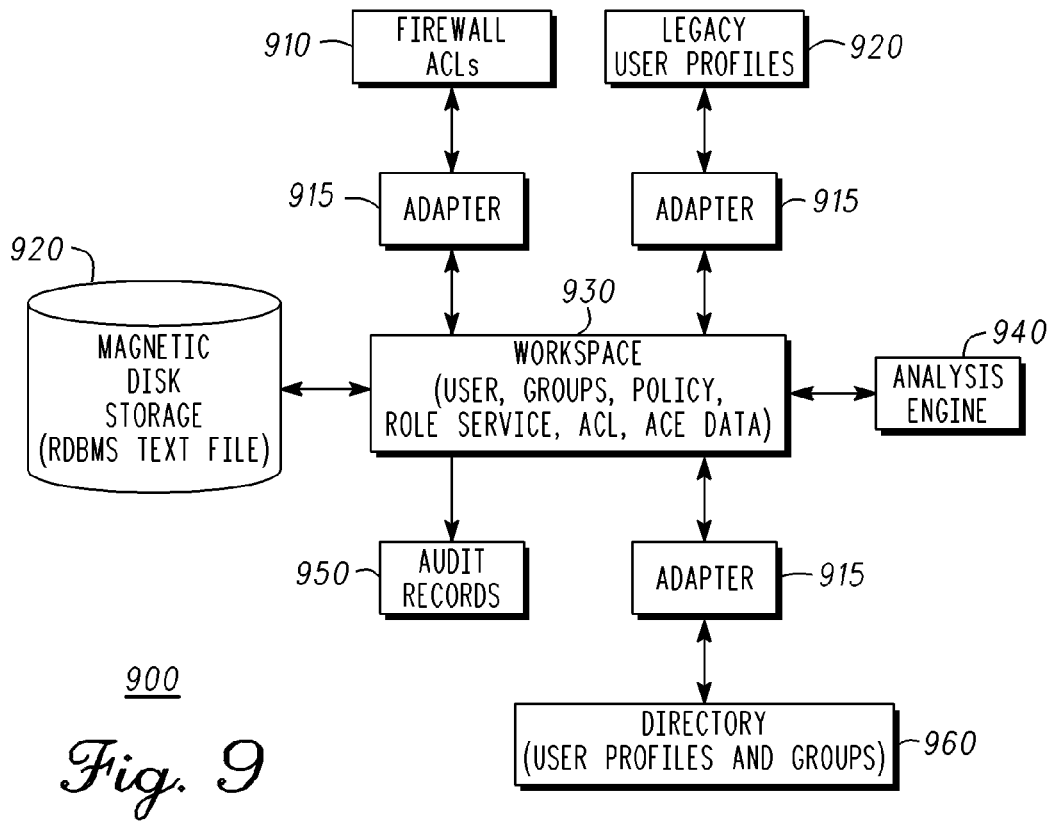
FIG. 9 illustrates architecture of a NAM, in accordance with certain embodiments.

At Block 380, NAM stores the results of the discovery process in its workspace, such as shown in FIG. 9, and also can generate a comprehensive audit record for each action that impacts an ACE, a NAR or a profile. The NAM workspace holds all data and metadata necessary to perform all computations and is linked to a persistence mechanism. Please refer to FIG. 9. It is further noted, with regard to the audit capability, that NAM may enable administrators to run the discovery process in a "what-if" mode in which the results are neither committed nor audited, but may be extracted for further analysis.

In this example scenario, the administrator starts with no predefined NARs, but uses NAM to explore a series of unmatched ACE sequences that the administrator identifies and labels as the NARs for WFM, WFM-PTRNCO, Messaging, and DNS. It turns out that the WFM application, including its WFM-PtnrCO feature set, has evolved over the years that external access has been granted, and therefore, some users have nonstandard access configuration. After initially identifying them, the administrator edits the WFM and WFM-PtnrCO NARs to conform to the current standards, and uses these versions to standardize similar accesses.

For purposes of illustration, consider the following listing of the discovered NARs in the example scenario. Note that the ACE sequences in this NAR could also be compressed using network object groups to represent sets of host to which the same access is permitted. The application of this established technique is eliminated for clarity here. Note that in the listings that follow, IP addresses are partially obscured (digits replaced with question marks) to protect confidentiality of enterprise networks.

```
ServiceCo User Profile Entry
permit ip any object-group hp-dns-compartment
permit tcp any object-group WFM_111144_WW_S_TCP_9500-9699 object-group
WFM_111144_WW_P_TCP_9500-9699
permit tcp any object-group WFM_111144_WW_S_TCP_5201-5202 object-group
WFM_111144_WW_P_TCP_5201-5202
permit tcp any object-group WFM_111144_WW_S_TCP_7010-7011 object-group
WFM_111144_WW_P_TCP_7010-7011
permit udp any object-group WFM_111144_WW_S_UDP_1289    object-group WFM_111144_WW_P_UDP_1289
permit udp any object-group WFM_111144_WW_S_UDP_1290    object-group WFM_111144_WW_P_UDP_1290
permit udp any object-group WFM_111144_WW_S_UDP_1225    object-group WFM_111144_WW_P_UDP_1225
permit tcp any object-group WFM_111144_WW_S_TCP_4100    object-group WFM_111144_WW_P_TCP_4100
permit tcp any object-group WFM_111144_WW_S_TCP_1409    object-group WFM_111144_WW_P_TCP_1409
permit tcp any object-group WFM_111144_WW_S_TCP_13010   object-group
WFM_111144_WW_P_TCP_13010
permit tcp any object-group WFM_111144_WW_S_TCP_80      object-group http
permit tcp any object-group WFM_111144_WW_S_TCP_443     object-group https
permit tcp any object-group WFM_111144_WW_S_TCP_8483    object-group WFM_111144_WW_P_TCP_8483
permit tcp any object-group WFM_111144_WW_S_TCP_446     object-group WFM_111144_WW_P_TCP_446
permit tcp any object-group WFM_111144_WW_S_TCP_13012   object-group
WFM_111144_WW_P_TCP_13012
permit tcp any object-group WFM_111144_WW_S_TCP_1100    object-group WFM_111144_WW_P_TCP_1100
```

| | |
|---|---|
| permit tcp any object-group WFM__111144__WW__S__TCP__8881 | object-group WFM__111144__WW__P__TCP__8881 |
| permit tcp any object-group WFM__111144__WW__S__TCP__8888 | object-group WFM__111144__WW__P__TCP__8888 | permit tcp any host ??.??.??.209 object-group http
permit tcp any host ??.??.??.224   object-group http
permit tcp any host ??.??.??.52    object-group http
permit tcp any host ??.??.??.129   object-group http
permit tcp any host ??.??.??.36    object-group http
permit tcp any host ??.??.??.33    object-group http
permit tcp any host ??.??.??.253   object-group http
permit tcp any host ??.??.??.252   object-group http
permit tcp any host ??.??.??.51    object-group https
permit tcp any host ??.??.??.24    object-group https
permit tcp any host ??.??.??.28    object-group https
permit tcp any host ??.??.??.57    object-group https
permit tcp any host ??.??.??.133   object-group https
permit tcp any object-group IMAP__EU__S      object-group IMAP__EU__P
permit tcp any object-group RPC__EU__S       object-group RPC__EU__P
permit tcp any object-group NTPWCHG__EU__S   object-group https
PtnrCo Named ACL
: ##ptnrco
: ## ----------------
: ## DNS :
access-list ptnrco permit ip any object-group hp-dns-compartment
: ## WFM - standard accesses
access-list ptnrco permit tcp any object-group WFM__111144__WW__S__TCP__9500-9699 object-group WFM__111144__WW__P__TCP__9500-9699
access-list ptnrco permit tcp any object-group WFM__111144__WW__S__TCP__5201-5202 object-group WFM__111144__WW__P__TCP__5201-5202
access-list ptnrco permit tcp any object-group WFM__111144__WW__S__TCP__7010-7011 object-group WFM__111144__WW__P__TCP__7010-7011
access-list ptnrco permit udp any object-group WFM__111144__WW__S__UDP__1289    object-group WFM__111144__WW__P__UDP__1289
access-list ptnrco permit udp any object-group WFM__111144__WW__S__UDP__1290    object-group WFM__111144__WW__P__UDP__1290
access-list ptnrco permit udp any object-group WFM__111144__WW__S__UDP__1225    object-group WFM__111144__WW__P__UDP__1225
access-list ptnrco permit tcp any object-group WFM__111144__WW__S__TCP__4100    object-group WFM__111144__WW__P__TCP__4100
access-list ptnrco permit tcp any object-group WFM__111144__WW__S__TCP__1409    object-group WFM__111144__WW__P__TCP__1409
access-list ptnrco permit tcp any object-group WFM__111144__WW__S__TCP__13010   object-group WFM__111144__WW__P__TCP__13010
access-list ptnrco permit tcp any object-group WFM__111144__WW__S__TCP__80      object-group http
access-list ptnrco permit tcp any object-group WFM__111144__WW__S__TCP__443     object-group https
access-list ptnrco permit tcp any object-group WFM__111144__WW__S__TCP__8483    object-group WFM__111144__WW__P__TCP__8483
access-list ptnrco permit tcp any object-group WFM__111144__WW__S__TCP__446     object-group WFM__111144__WW__P__TCP__446
access-list ptnrco permit tcp any object-group WFM__111144__WW__S__TCP__13012   object-group WFM__111144__WW__P__TCP__13012
access-list ptnrco permit tcp any object-group WFM__111144__WW__S__TCP__1100    object-group WFM__111144__WW__P__TCP__1100
access-list ptnrco permit tcp any object-group WFM__111144__WW__S__TCP__8881    object-group WFM__111144__WW__P__TCP__8881
access-list ptnrco permit tcp any object-group WFM__111144__WW__S__TCP__8888    object-group WFM__111144__WW__P__TCP__8888
: ## end of WFM - standard accesses
: ## WFM - specific accesses (ptnrco-specific, complement to standard WFM application accesses)
: ## tcp 4100
access-list ptnrco permit tcp any host ??.??.??.152 object-group WFM__111144__WW__P__TCP__4100
access-list ptnrco permit tcp any host ??.??.??.91 object-group WFM__111144__WW__P__TCP__4100
access-list ptnrco permit tcp any host ??.??.??.65 object-group WFM__111144__WW__P__TCP__4100
access-list ptnrco permit tcp any host ??.??.??.60 object-group WFM__111144__WW__P__TCP__4100
access-list ptnrco permit tcp any host ??.??.??.218 object-group WFM__111144__WW__P__TCP__4100
access-list ptnrco permit tcp any host ??.??.??.219 object-group WFM__111144__WW__P__TCP__4100
access-list ptnrco permit tcp any host ??.??.??.242 object-group WFM__111144__WW__P__TCP__4100
access-list ptnrco permit tcp any host ??.??.??.241 object-group WFM__111144__WW__P__TCP__4100
access-list ptnrco permit tcp any host ??.??.??.26 object-group WFM__111144__WW__P__TCP__4100
access-list ptnrco permit tcp any host ??.??.??.25 object-group WFM__111144__WW__P__TCP__4100
access-list ptnrco permit tcp any host ??.??.??.38 object-group WFM__111144__WW__P__TCP__4100
access-list ptnrco permit tcp any host ??.??.??.39 object-group WFM__111144__WW__P__TCP__4100
: ## tcp 5201-5202
access-list ptnrco permit tcp any host ??.??.??.65 object-group WFM__111144__WW__P__TCP__5201-5202
access-list ptnrco permit tcp any host ??.??.??.60 object-group WFM__111144__WW__P__TCP__5201-5202
access-list ptnrco permit tcp any host ??.??.??.242 object-group WFM__111144__WW__P__TCP__5201-5202
access-list ptnrco permit tcp any host ??.??.??.241 object-group WFM__111144__WW__P__TCP__5201-5202
: ## tcp 9500 9699
access-list ptnrco permit tcp any host ??.??.??.65 object-group WFM__111144__WW__P__TCP__9500-9699
access-list ptnrco permit tcp any host ??.??.??.60 object-group WFM__111144__WW__P__TCP__9500-9699
access-list ptnrco permit tcp any host ??.??.??.242 object-group WFM__111144__WW__P__TCP__9500-9699

-continued

```
access-list ptnrco permit tcp any host ??.??.??.241 object-group WFM_111144_WW_P_TCP_9500-9699
: ## udp 1289
access-list ptnrco permit udp any host ??.??.??.152 object-group WFM_111144_WW_P_UDP_1289
access-list ptnrco permit udp any host ??.??.??.91 object-group WFM_111144_WW_P_UDP_1289
access-list ptnrco permit udp any host ??.??.??.218 object-group WFM_111144_WW_P_UDP_1289
access-list ptnrco permit udp any host ??.??.??.219 object-group WFM_111144_WW_P_UDP_1289
: ## tcp 1409
access-list ptnrco permit tcp any host ??.??.??.63 object-group WFM_111144_WW_P_TCP_1409
: ## end of WFM - specific accesses
: ## Messaging servers access
access-list ptnrco permit tcp any object-group IMAP_EU_S      object-group IMAP_EU_P
access-list ptnrco permit tcp any object-group RPC_EU_S       object-group RPC_EU_P
access-list ptnrco permit tcp any object-group NTPWCHG_EU_S object-group https
... [large number of access-list entries omitted]
: ## end ofptnrco named ACL
: ## ---------------------------------
Discovered Network Access Roles
For DNS:
access-list dns permit ip any object-group hp-dns-compartment
For WFM:
access-list wfm permit tcp any object-group WFM_111144_WW_S_TCP_9500-9699 object-group
WFM_111144_WW_P_TCP_9500-9699
access-list wfm permit tcp any object-group WFM_111144_WW_S_TCP_5201-5202 object-group
WFM_111144_WW_P_TCP_5201-5202
access-list wfm permit tcp any object-group WFM_111144_WW_S_TCP_7010-7011 object-group
WFM_111144_WW_P_TCP_7010-7011
access-list wfm permit udp any object-group WFM_111144_WW_S_UDP_1289    object-group
WFM_111144_WW_P_UDP_1289
access-list wfm permit udp any object-group WFM_111144_WW_S_UDP_1290    object-group
WFM_111144_WW_P_UDP_1290
access-list wfm permit udp any object-group WFM_111144_WW_S_UDP_1225    object-group
WFM_111144_WW_P_UDP_1225
access-list wfm permit tcp any object-group WFM_111144_WW_S_TCP_4100    object-group
WFM_111144_WW_P_TCP_4100
access-list wfm permit tcp any object-group WFM_111144_WW_S_TCP_1409    object-group
WFM_111144_WW_P_TCP_1409
access-list wfm permit tcp any object-group WFM_111144_WW_S_TCP_13010   object-group
WFM_111144_WW_P_TCP_13010
access-list wfm permit tcp any object-group WFM_111144_WW_S_TCP_80      object-group http
access-list wfm permit tcp any object-group WFM_111144_WW_S_TCP_443     object-group https
access-list wfm permit tcp any object-group WFM_111144_WW_S_TCP_8483    object-group
WFM_111144_WW_P_TCP_8483
access-list wfm permit tcp any object-group WFM_111144_WW_S_TCP_446     object-group
WFM_111144_WW_P_TCP_446
access-list wfm permit tcp any object-group WFM_111144_WW_S_TCP_13012   object-group
WFM_111144_WW_P_TCP_13012
access-list wfm permit tcp any object-group WFM_111144_WW_S_TCP_1100    object-group
WFM_111144_WW_P_TCP_1100
access-list wfm permit tcp any object-group WFM_111144_WW_S_TCP_8881    object-group
WFM_111144_WW_P_TCP_8881
access-list wfm permit tcp any object-group WFM_111144_WW_S_TCP_8888    object-group
WFM_111144_WW_P_TCP_8888
For web server:
access-list web_servers permit tcp any host ??.??.??.209 object-group http
access-list web_servers permit tcp any host ??.??.??.224    object-group http
access-list web_servers permit tcp any host ??.??.??.52     object-group http
access-list web_servers permit tcp any host ??.??.??.129    object-group http
access-list web_servers permit tcp any host ??.??.??.36      object-group http
access-list web_servers permit tcp any host ??.??.??.33     object-group http
access-list web_servers permit tcp any host ??.??.??.253    object-group http
access-list web_servers permit tcp any host ??.??.??.252    object-group http
access-list web_servers permit tcp any host ??.??.??.51     object-group https
access-list web_servers permit tcp any host ??.??.??.24     object-group https
access-list web_servers permit tcp any host ??.??.??.28     object-group https
access-list web_servers permit tcp any host ??.??.??.57   object-group https
access-list web_servers permit tcp any host ??.??.??.133 object-group https
access-list web_servers include web_servers
access-list web_servers include web_servers
For messaging servers:
access-list messaging permit tcp any object-group IMAP_EU_S      object-group IMAP_EU_P
access-list messaging permit tcp any object-group RPC_EU_S       object-group RPC_EU_P
access-list messaging permit tcp any object-group NTPWCHG_EU_S object-group https
For PtnrCo-specific access to WFM
: ## tcp 4100
access-list wfm-ptnrco permit tcp any host ??.??.??.152 object-group WFM_111144_WW_P_TCP_4100
access-list wfm-ptnrco permit tcp any host ??.??.??.91 object-group WFM_111144_WW_P_TCP_4100
access-list wfm-ptnrco permit tcp any host ??.??.??.65 object-group WFM_111144_WW_PTC_P_4100
access-list wfm-ptnrco permit tcp any host ??.??.??.60 object-group WFM_111144_WW_P_TCP_4100
access-list wfm-ptnrco permit tcp any host ??.??.??.218 object-group WFM_111144_WW_P_TCP_4100
access-list wfm-ptnrco permit tcp any host ??.??.??.219 object-group WFM_111144_WW_P_TCP_4100
```

-continued

```
access-list wfm-ptnrco permit tcp any host ??.??.??.242 object-group WFM_111144_WW_P_TCP_4100
access-list wfm-ptnrco permit tcp any host ??.??.??.241 object-group WFM_111144_WW_P_TCP_4100
access-list wfm-ptnrco permit tcp any host ??.??.??.26 object-group WFM_111144_WW_P_TCP_4100
access-list wfm-ptnrco permit tcp any host ??.??.??.25 object-group WFM_111144_WW_P_TCP_4100
access-list wfm-ptnrco permit tcp any host ??.??.??.38 object-group WFM_111144_WW_P_TCP_4100
access-list wfm-ptnrco permit tcp any host ??.??.??.39 object-group WFM_111144_WW_P_TCP_4100
: ## tcp 5201-5202
access-list wfm-ptnrco permit tcp any host ??.??.??.65 object-group WFM_111144_WW_P_TCP_5201-5202
access-list wfm-ptnrco permit tcp any host ??.??.??.60 object-group WFM_111144_WW_P_TCP_5201-5202
access-list wfm-ptnrco permit tcp any host ??.??.??.242 object-group WFM_111144_WW_P_TCP_5201-5202
access-list wfm-ptnrco permit tcp any host ??.??.??.241 object-group WFM_111144_WW_P_TCP_5201-5202
: ## tcp 9500 9699
access-list wfm-ptnrco permit tcp any host ??.??.??.65 object-group WFM_111144_WW_P_TCP_9500-9699
access-list wfm-ptnrco permit tcp any host ??.??.??.60 object-group WFM_111144_WW_P_TCP_9500-9699
access-list wfm-ptnrco permit tcp any host ??.??.??.242 object-group WFM_111144_WW_P_TCP_9500-9699
access-list wfm-ptnrco permit tcp any host ??.??.??.241 object-group WFM_111144_WW_P_TCP_9500-9699
: ## udp 1289
access-list wfm-ptnrco permit udp any host ??.??.??.152 object-group WFM_111144_WW_P_UDP_1289
access-list wfm-ptnrco permit udp any host ??.??.??.91  object-group WFM_111144_WW_P_UDP_1289
access-list wfm-ptnrco permit udp any host ??.??.??.218 object-group WFM_111144_WW_P_UDP_1289
access-list wfm-ptnrco permit udp any host ??.??.??.219 object-group WFM_111144_WW_P_UDP_1289
: ## tcp 1409
access-list wfm-ptnrco permit tcp any host ??.??.??.63 object-group WFM_111144_WW_P_TCP_1409
```

Policy Establishment

The policy establishment process takes the output of the discovery process and builds the groups and policies necessary for policy-based access management. Policy establishment also sets the stage for delegated provisioning by assigning administrative responsibilities for groups and policies. The process consists of the following tasks:

Reconciliation and Policy Generation. In the legacy network environment, groups are generally used for ACL assignment. To the extent that this process has been followed consistently, members of the same legacy group should have the same NAR assignments and, therefore, the same NARs in their NAM profiles. NAM verifies this correspondence, creates new groups, such as directory groups, for instance, that correspond to legacy groups, and generates the policies necessary to manage the new groups. This is illustrated in functional block diagram 400 of FIG. 4. Legacy group memberships are provided to NAM 420 from legacy group store 410. As used herein, the term directory group need not employ an actual directory but refers to any group stored within a repository, such as databases, files, directories, etc., useful for storing group information.

In our example, NAM 420 creates two directory groups NAM-ServiceCo and NAM-PARTNERCO, with the same members as their legacy counterparts, ServiceCo and PARTNERCO. So, using set notation, NAM-ServiceCo={Alice, Betty, Charles}

NAM-PARTNERCO={David, Edward, Frank}

NAM 420 also creates the following policies, based on the NARs that were discovered and assigned to users in the prior discovery process. The Service attribute is input by the administrator 440 based on the access method used by the each group:

| Group | Service | NAR |
| --- | --- | --- |
| NAM-ServiceCo | ClientVPN | WFM |
| NAM-ServiceCo | ClientVPN | Messaging |
| NAM-ServiceCo | ClientVPN | DNS |
| NAM-ServiceCo | ClientVPN | WebServers |
| NAM-PtnrCo | LeasedLine | WFM |
| NAM-PtnrCo | LeasedLine | WFM-PtnrCo |
| NAM-PtnrCo | LeasedLine | Messaging |
| NAM-PtnrCo | LeasedLine | DNS |
| NAM-PtnrCo | LeasedLine | WebServers |

Exception processing. For groups with inconsistent NAR assignments, NAM reports exceptions that must be resolved by a network access administrator 440. For example, a subset of a group's membership might have been assigned a NAR not shared by the rest of the group. The administrator could choose to assign this subset to an additional group for administration of the additional NARs. NAM supports acquisition of multiple NARs by individuals through membership in multiple groups. Alternatively, the administrator could decide that the additional NARs are not needed for these group members, and revoke them.

In the example scenario, Frank of PtnrCo is missing access to WFM-PtnrCo, even though the rest of his group has access. Also, Alice of ServiceCo, has always had access to WFM-PtnrCo, due to an administrative error years ago. Since these differences are apparent for a clear minority of group members, NAM flags them as exceptions, and the administrator corrects them.

Administrative assignment. After exceptions have been resolved, the network access administrator 440 can now delegate management of each group and policy to the most appropriate user. In the example, the administrator delegates the management of the ServiceCo group to Alice of ServiceCo, who can then manage employee turnover in the pool of employees assigned to serve the enterprise. Similarly, the administrator delegates management of the PtnrCo group to Frank of PtnrCo. The policy management of both groups is delegated to Jane, an IT administrator responsible for the services made available to ServiceCo and PtnrCo.

It is noted that changes to NARs, policies and groups made by resource access administrators, such as Jane, are updated in a repository, such as directory 430 or other storage element, such as in ACLs stored on firewalls and in ACL references in user profiles by the NAM 420.

Action (1) of FIG. 4 may occur once per network environment, while actions (2)-(4) can be iterative at the administrator's discretion.

Figure 5:
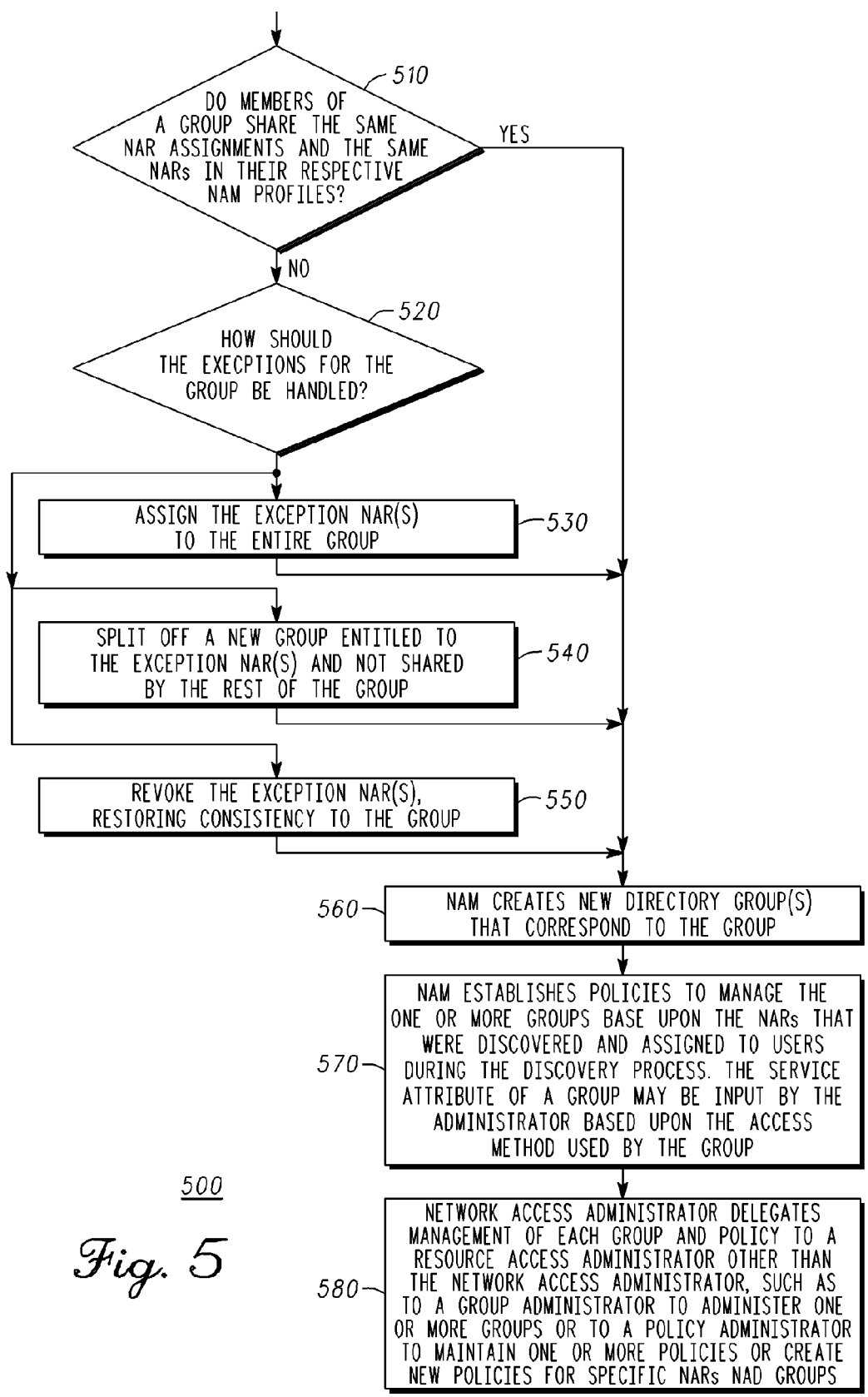
FIG. 5 is a flowchart that illustrates the policy establishment process, in accordance with certain embodiments.

This policy establishment may be further understood by reference to flow 500 of FIG. 5. At Decision Block 510, the inquiry is whether members of a group, such as a legacy group, share the same NAR assignments and the same NARs in their respective NAM profiles. If no, then at Decision Block 520, a decision must be taken with regard to how the exceptions for a group are to be handled, and any of the exception actions in Blocks 530, 540, 550 may be undertaken. For instance, the exception NAR(s) may be assigned to the entire group, which may result in changing group privileges (Block 530); a split in the group may occur and the split off group may be entitled to the exception NAR(s) and not shared by the rest of the group (Block 540); or the exception NAR(s) may be revoked, thereby restoring consistency to the group (Block 550).

Next, at Block 560, NAM creates one or more new groups, such as directory groups, that corresponds to the legacy group; depending on how exceptions are resolved, there may be more than one new directory group. At Block 570, NAM establishes policies to manage the legacy group(s) based upon the NARs that were discovered and assigned to users during the discovery process. The service attribute of a legacy group may be input by the administrator based upon the access method used by the legacy group. Finally, at Block 580, the network access administrator delegates management of each group and policy to an entity other than the network access administrator, called a resource access administrator, such as to a group administrator to administer one or more groups or to policy administrator to maintain one or more policies or to create new policies for specific NARs and groups.

It is further understood that the NAM may be enhanced to filter discovered NARs for compliance with lists of approved ports, protocols, and destinations published by the network access administrator. Violations could be flagged and the network access administrator could delete or modify the non-compliant NAR; it could further be extracted for further analysis or security review.

Policy-Based Access Management and Delegated Provisioning

NAM uses access policies to allocate NARs to user groups rather than explicitly assigning combinations of hosts, ports and protocols. This policy-based access management approach enables non-specialists to administer network access by allocating NARs that have been formulated and reviewed by application, network, and security specialists and stored within NAM.

Figure 6:
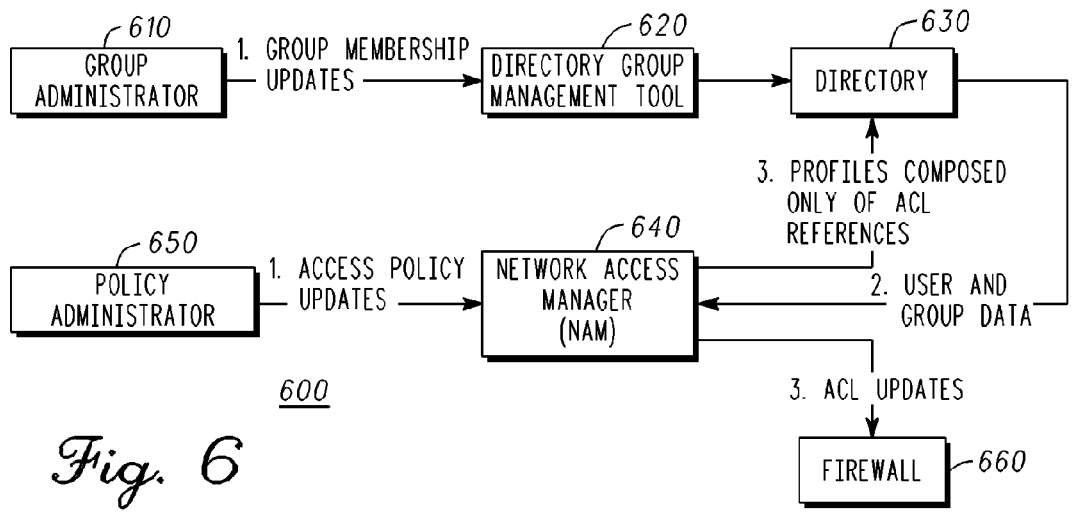
FIG. 6 is a functional block diagram of the delegated provisioning process, in accordance with certain embodiments.

Referring now to FIG. 6, functional block diagram 600 illustrates delegated provisioning in accordance with certain embodiments. It can be understood from this figures that delegated provisioning is a form of policy-based access management that enables authorized users responsible for particular business processes and partner relationships to directly and efficiently control access configurations that are critical to those processes and relationships.

Delegated provisioning provides for two administrative roles. Policy administrators 650 create and maintain policies. Each policy associates a group, a service, and an NAR. Group administrators 610 create and maintain groups of users that share one or more NARs by providing group membership updates to group management tool 620, which in turn provides information to directory 630 or other repository/storage element so that it can provide user and group data to NAM 640 as shown. NAM 640 communicates with both directory 630, to which it provides profiles composed of ACL references, and ACL updates to firewall 660. Since both of these administrative roles require only the ability to use straightforward interactive tools, management may assign them to individuals based on their familiarity with particular business processes and relationships. As policy administrators and group administrators create and maintain NARs, policies, and groups, NAM 640 implements these changes by updating the ACLs stored on firewalls 660 and the ACL references in user profiles stored in directory 630. It can be understood that the entire delegated provisioning process is iterative from FIG. 6.

Figure 7:
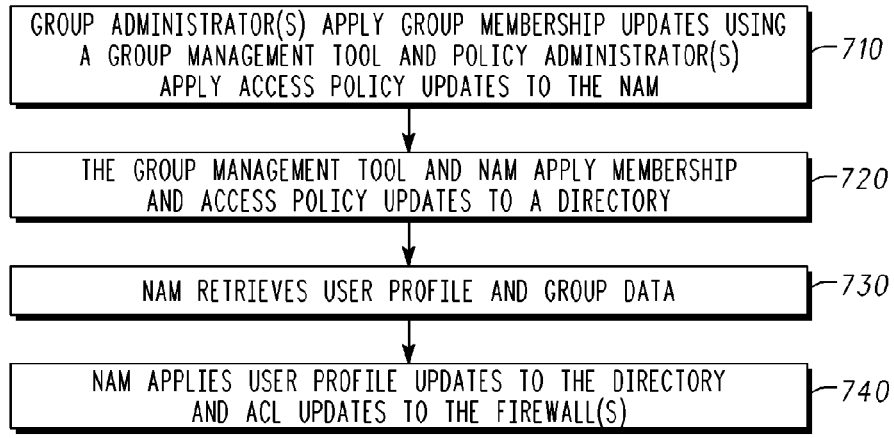
FIG. 7 is a flowchart of the delegated provisioning process, in accordance with certain embodiments.

This process may be further understood by reference to flow 700 of FIG. 7. Group administrators 610 administer groups that share one or more NARs and policy administrators 650 create and maintain policies. Accordingly, at Block 710, Group Administrator(s) 610 apply group membership updates using a group management tool 620 and Policy administrator(s) 650 apply access policy updates to the NAM 640. It is noted that these two actions of group administration and policy administration may occur asynchronously and may occur in parallel. At Block 720, the group management tool and NAM apply group membership and access policy updates to a directory 630. At Block 730, the NAM retrieves user profile and group data; again group administration and policy administration are different flows and thus may occur asynchronously. At Block 740, NAM 640 applies user profile updates to the directory 630 and ACL updates to the firewall(s) 660.

In the example scenario, Alice and Frank both maintain the membership of their companies' groups, adding and removing members as colleagues come and go, while Jane controls the policies. After the PtnrCo access method is migrated from a leased line to Site-to-site VPN, and a new VideoChat application is made available to ServiceCo and PtnrCo, the updated policy set looks like this:

| Group | Service | NAR |
|---|---|---|
| NAM-ServiceCo | ClientVPN | WFM |
| NAM-ServiceCo | ClientVPN | Messaging |
| NAM-ServiceCo | ClientVPN | DNS |
| NAM-ServiceCo | ClientVPN | WebServers |
| NAM-ServiceCo | ClientVPN | VideoChat |
| NAM-PtnrCo | SiteVPN | WFM |
| NAM-PtnrCo | SiteVPN | WFM-PtnrCo |
| NAM-PtnrCo | SiteVPN | Messaging |
| NAM-PtnrCo | SiteVPN | DNS |
| NAM-PtnrCo | SiteVPN | WebServers |
| NAM-ServiceCo | SiteVPN | VideoChat |

Figure 8:
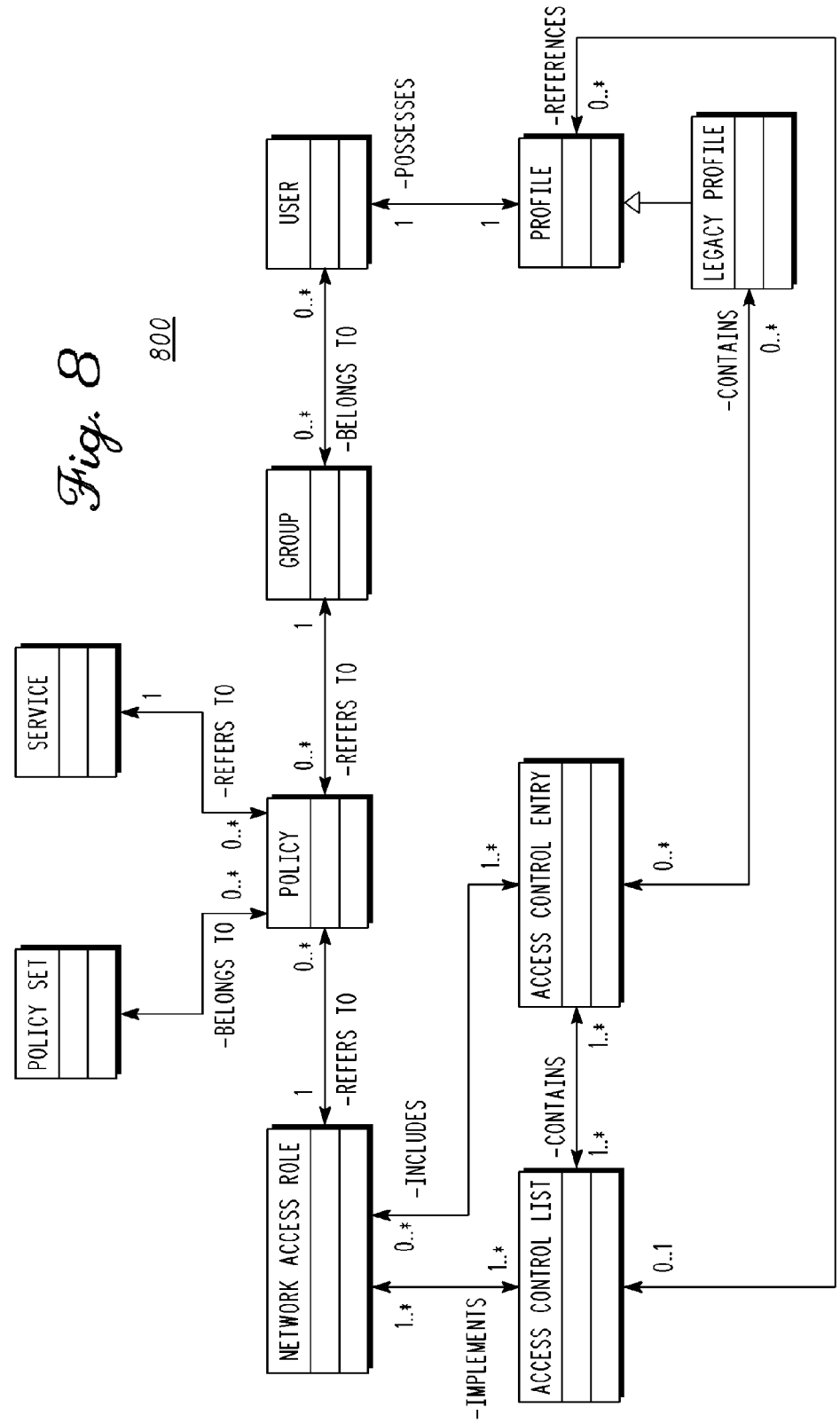
FIG. 8 illustrates a Network ACL Manager data model, in accordance with certain embodiments.

A network ACL manager data model 800 is illustrated in FIG. 8, in accordance with certain embodiments. The network ACL manager data model describes the interrelationship between the types of data that NAM processes. A NAR is a collection of ACEs defining access to a set of resources. An ACL implements one or more NARs. Users may belong to one or more groups and each group may contain multiple users. Groups may also be associated with project identifiers, since they will represent sets of external users whose access should be managed collectively. In such a situation, each group may be associated with exactly one project.

Legacy profiles contain user-to-ACE mappings, either explicitly or through ACL references. The profiles generated by NAM, however, each contain only a reference to a NAM-generated ACL in certain of the embodiments.

A policy ties together a NAR, a group and a service, and implies that group members may access resources according to the ACEs in the NAR by using the service to connect to the HP Intranet. Policies within a single NAM instance are members of the same policy set.

Referring now to block diagram 900 of FIG. 9, an exemplary architecture of a NAM is illustrated. Components of NAM in this example include the NAM workspace, an analysis engine and adapters that interface with external components. Adapters may be software components that synchronize the NAM workspace 930 with firewall devices 910 and data stores 920. They detect changes in the NAM workspace that should result in changes to these external components, transform changed workspace elements into equivalent commands for firewall configuration changes or data store updates, and apply these commands to the external components. Similarly, they detect changes in external components, transform these changes into workspace elements, and apply these changes to the NAM workspace. It is noted that all three adapters 915 shown in the figure may be based on commercial products designed to update and otherwise manage distributed directory infrastructure, firewalls, and other devices or data stores.

The workspace 930 stores the data objects (FIG. 8) that NAM processes. During discovery, NAM loads legacy profiles 920 and pre-existing ACLs into its workspace. During delegated provisioning, NAM loads group memberships into its workspace. The workspace may be synchronized to disk storage 920 after each major part of the process discussed herein. The workspace is recreated from persistent storage upon NAM startup, and is synchronized to persistent storage prior to each shutdown. It is further envisioned that a NAM graphical user interface (GUI) may be implemented with a relational database as the persistent store 920. Moreover, a text-based persistent store for NARs and other reusable ACL components could be used.

The analysis engine 940 is the algorithmic core of NAM. It contains the logic that is used to perform discovery and delegated provisioning. The analysis engine takes input from the NAM workspace, processes it, and places the results back into the workspace. As discussed, the adapters 915 are used to interface with the firewall 910, legacy profile store 920, and the directory 960, or other repository elements.

In addition to that described above, it is further understood that the NAM may be enhanced to filter discovered NARs for compliance with lists of approved ports, protocols, and destinations published by the network access administrator. Violations could be flagged and the network access administrator could delete or modify the non-compliant NAR; it could further be extracted for further analysis or security review.

Moreover, NAM manages ACLs that are enforced for individual users by authenticating firewalls. The ACEs within these ACLs generally have a source of any, since they are designed to provide access to users regardless of location. The same is true for ACLs used to control individually authenticated access over leased lines as well as site-site and MPLS VPNs, so the NAM approach could easily be adapted to these types of connections as well.

The NAM approach could be further adapted to managing firewall and filtering router ACLs that specify partner subnets as sources and certain resources as destinations, or vice versa. NARs could be discovered by examining the access relationships between partner network locations and the resources. The resulting NAR hierarchy could be used to streamline management of unauthenticated network access. Also, in cases where authenticated session traffic flows through both a filtering router and an authenticating firewall, comparisons of NAR assignments or generated ACLs could be used to detect conflicts between device configurations. For example, a filtering router ACL could prevent some of the access allowed by an ACL referenced in a Network user's profile.

As described herein, the NAM prototype demonstrates an alternative to conventional approaches to network access management in which day-to-day operations depend on a team of network specialists. The NAM approach is applicable to any type of network connection in which users are individually authenticated and authorized, and could be enhanced to manage limited access from specific subnets or hosts. It increases operational efficiency, agility, and throughput by enabling trained and accountable specialists to structure common access control decisions and securely delegate them to the individuals directly responsible for enabling the processes and relationships that require network access.

It will be appreciated that embodiments of the invention described herein may be comprised of one or more conventional processors and unique stored program instructions that control the one or more processors to implement, some, most, or all of the functions described herein. As such, these functions may be interpreted as a method to perform functions in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of policy-based, delegated network access management, comprising:
    for each discovered access control entry (ACE) sequence of a plurality of discovered ACE sequences, during a discovery process:

determining whether the discovered ACE sequence is stored in a legacy profile or associated with legacy profiles by an access control list (ACL) reference;

assigning to the discovered ACE sequence a network access role (NAR) determined by whether the discovered ACE sequence matches, either exactly, partially, or not at all, an existing NAR, and whether the discovered ACE sequence is a valid expression;

during a policy establishment process:
    establishing one or more policies to manage one or more user groups based upon the NARs discovered and assigned to ACE sequences during the discovery process;
    a network access administrator delegating management of the one or more user groups and the one or more established policies to one or more resource access administrators responsible for administering the one or more user groups and the one or more policies; and during a delegated provisioning process:
    the one or more resource access administrators administering network access by allocating NARs that have been approved by the network access administrator.

2. The method of claim 1, wherein the NARS approved by the network access administrator are stored within a network access manager (NAM).

3. The method of claim 1, further comprising updating stored ACLs to reflect changes made to the NARs, the one or more policies, and the one or more user groups by the resource access administrator.

4. The method of claim 3, further comprising the NAM storing the updated stored ACLs in user profiles stored in a firewall.

5. The method of claim 1, for the discovery process further comprising:
    determining for each discovered access control entry (ACE) sequence of the plurality of discovered ACE sequences whether the discovered ACE sequence matches an existing NAR;
    if the discovered ACE sequence matches the existing NAR, assigning the existing NAR to one or more users having a profile that contains the discovered ACE sequence;
    if the discovered ACE sequence does not match the existing NAR, further comprising:
        determining whether the discovered ACE sequence at least partially matches the existing NAR;
    if the discovered ACE sequence at least partially matches the existing NAR, presenting to the network access administrator the partial match and the network access administrator performing a partial match action;
    if the discovered ACE sequence does not at least partially match the existing NAR, performing one or more of proposing to the network access administrator a new NAR and determining whether the discovered ACE sequence is a valid expression.

6. The method of claim 5, further comprising storing results of the discovery process in a workspace.

7. The method of claim 6, further comprising generating an audit record from the results stored in the workspace of the NAM.

8. The method of claim 5, wherein if the discovered ACE sequence at least partially matches the existing NAR, the discovered ACE sequence is a partial match and further comprising presenting to the network access administrator a match ratio and a number of profiles in which the discovered ACE sequence occurs.

9. The method of claim 5, wherein the partial match action comprising one or more of creating a new NAR using the partial match, standardizing permissions associated with an existing NAR by assigning the partial match to all users having profiles comprising the partial match, and taking no action with the partial match.

10. The method of claim 5, wherein if the discovered ACE sequence does not at least partially match the existing NAR, communicating to the network access administrator the number of times the new NAR occurs within user profiles of the one or more user groups.

11. The method of claim 5, wherein if the discovered ACE sequence does not at least partially match the existing NAR, further comprising the network access administrator performing a no match action.

12. The method of claim 1, wherein during the policy establishment process further comprising:
    determining whether members of a user group, of the one or more user groups, each having a profile, share a NAR assignment and a NAR as reflected in their profiles;
    if members of the user group do not share a NAR assignment and a NAR, the network access manager performing an exception action;
    creating a new directory group corresponding to the user group;
    establishing one or more policies capable of managing the new directory group based upon the NARs discovered and assigned to users of the user group during the discovery process;
    the network access manager delegating management of the user group to the one or more resource access administrators.

13. The method of claim 1, wherein the one or more resource access administrators comprise one or more group administrators and one or more policy administrators and wherein during the delegated provisioning process further comprise:
    the one or more group administrators providing group membership updates to a management tool to administer the one or more user groups;
    the one or more policy administrators providing access policy updates to a network access manager (NAM) to create and maintain policies of the one or more user groups;
    the management tool and the NAM sending group membership and access policy updates to a repository;
    the repository sending user and group data to the NAM;
    the NAM sending profiles having ACL references of the plurality of user of the one or more user groups to the repository.

14. The method of claim 13, the NAM sending ACL updates to a firewall.

* * * * *